(12) United States Patent
Venkataramanan et al.

(10) Patent No.: US 10,171,344 B1
(45) Date of Patent: Jan. 1, 2019

(54) ISOLATION OF ENDPOINTS WITHIN AN ENDPOINT GROUP

(71) Applicant: Cisco Technology, Inc., San Jose, CA (US)

(72) Inventors: Gautam Venkataramanan, Sunnyvale, CA (US); Umamaheswararao Karyampudi, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/422,773

(22) Filed: Feb. 2, 2017

(51) Int. Cl.
| | | |
|---|---|---|
| H04L 12/28 | (2006.01) | |
| H04L 12/761 | (2013.01) | |
| H04L 12/931 | (2013.01) | |
| H04L 29/08 | (2006.01) | |
| H04L 12/823 | (2013.01) | |
| H04L 12/46 | (2006.01) | |
| H04L 12/715 | (2013.01) | |

(52) U.S. Cl.
CPC .......... *H04L 45/16* (2013.01); *H04L 12/4633* (2013.01); *H04L 12/4641* (2013.01); *H04L 45/64* (2013.01); *H04L 47/32* (2013.01); *H04L 49/70* (2013.01); *H04L 69/324* (2013.01)

(58) Field of Classification Search
CPC ..... H04L 45/16; H04L 12/4641; H04L 45/64; H04L 12/4633; H04L 69/324; H04L 49/70; H04L 47/32
See application file for complete search history.

(56) References Cited

U.S. PATENT DOCUMENTS

| | | | |
|---|---|---|---|
| 9,032,077 B1 | 5/2015 | Klein et al. | |
| 9,407,501 B2 | 8/2016 | Yadav et al. | |
| 2013/0254375 A1* | 9/2013 | Agiwal | H04L 43/0882 709/224 |
| 2014/0156814 A1* | 6/2014 | Barabash | H04L 41/0803 709/220 |
| 2015/0124809 A1* | 5/2015 | Edsall | H04L 47/20 370/390 |
| 2015/0124823 A1* | 5/2015 | Pani | H04L 12/18 370/392 |
| 2015/0163158 A1* | 6/2015 | Ryland | H04L 47/70 709/225 |
| 2015/0347120 A1* | 12/2015 | Garg | H04L 41/5038 709/223 |

OTHER PUBLICATIONS

Principles of Application Centric Infrastructure:, Cisco, White Paper, http://www.cisco.com/go/aci, C11-729906-00, Nov. 2013, 7 pages.

* cited by examiner

*Primary Examiner* — Clemence S Han
(74) *Attorney, Agent, or Firm* — Edell, Shapiro & Finnan, LLC (57) ABSTRACT

An ingress network device of a network fabric mark packets with source endpoint group information to enable intra-EPG isolation. The ingress network device receives an indication of endpoints associated with an isolated endpoint group that restricts network traffic among members of the isolated endpoint group. The ingress network device receives a packet from a source and detects that the source endpoint belongs to the isolated endpoint group. The ingress network device incorporates source endpoint group information into a header of the packet. The source endpoint group information indicates that the source endpoint belongs to the isolated endpoint group.

20 Claims, 7 Drawing Sheets

ISOLATION OF ENDPOINTS WITHIN AN ENDPOINT GROUP

TECHNICAL FIELD

The present disclosure relates to access control in a software defined network.

BACKGROUND

Software defined networking presents a standards based control and data plane solution for building the next generation data centers. For example, the Application Centric Infrastructures provided by Cisco® is a software defined networking solution designed to automate, configure, and manage data center fabrics, and has become popular in enterprise data center environments. Cisco is a registered trademark of Cisco Technology, Inc.

In certain cases, a data center may serve different tenants (i.e., multiple different organizations, separate entities within an organization, etc.). Such data centers, sometimes referred to as multi-tenant data centers, provide logical separation/segregation between each of the different tenants, as well as security, scalability, and per-tenant services, all of which are designed to simplify management and orchestration. As the use of data center virtualization continues to expand, security and management are becoming increasingly important.

DESCRIPTION OF EXAMPLE EMBODIMENTS

Overview

Presented herein are techniques that enable an ingress network device of a network fabric to mark packets with source endpoint group information and provide intra-EPG isolation. The ingress network device receives an indication that a plurality of endpoints are associated with a first isolated endpoint group that restricts network traffic between/among the plurality of endpoints. The ingress network device receives a packet from a source endpoint, and detects that the source endpoint is one of the plurality of endpoints in the first isolated endpoint group. The ingress network device incorporates source endpoint group information into a header of the packet. The source endpoint group information indicates that the source endpoint belongs to the first isolated endpoint group.

DETAILED DESCRIPTION

The group-based policy (GBP) framework is used with certain software defined networking technologies and provides an intent-driven declarative policy model which can drastically simplify application deployment. The GBP framework builds on the principle of capturing application requirements directly instead of converting the requirements into specific infrastructure configurations or protocols. More specifically, the GBP framework is based on the concepts of "groups" and "policy model." A group represents a logical collection of network endpoints (endpoints) and fully describes the endpoint properties. These properties are not limited to network addresses (e.g., Internet Protocol (IP) or Media Access Control (MAC) addresses), but instead can include a wide variety of attributes associated with the endpoints, such as the operating system the endpoints run, common substrings in the assigned endpoint names, associated security tags, etc. The policy model describes the relationships between the different logical groups. For example, the policy model includes "policy rule sets" that are used to create restrictions on traffic sent between different groups. As such, the policy rule sets offer a simple way to describe how collections of endpoints can communicate, without resorting to network details such as the IP routes and access control lists (ACLs).

Certain software defined networking technologies, such as the Application Centric Infrastructure (ACI) provided by Cisco®, make use of the GBP framework to provide application policy-based solutions through scalable distributed enforcement. Cisco is a registered trademark of Cisco Technology, Inc. Such software defined networking technologies generally support integration of physical and virtual environments under one declarative policy model for networks, servers, services, and security. Merely for ease of illustration, the examples presented herein are described with reference to the ACI framework. However, it is to be appreciated that the examples presented herein may be used with other software defined networking technologies that utilize the GBP framework.

In the ACI framework, the groups of endpoints are referred to as Endpoint Groups (EPGs). An EPG is a way to map applications to networking constructs comprised of Virtual Local Area Networks (VLANs) and or Virtual Extensible LANs (VxLANs). Each EPG represents a security trust zone. In general, an EPG is a collection of end points that share common policy requirements such as security, Quality of Service (QoS), and services. Application policies can be applied between EPGs, rather than to endpoints directly, in the form of contracts.

In certain virtualized environments, such as VMWare vSphere®, EPGs are implemented/defined as distributed virtual switch (DVS) port groups. VMWare vSphere is a registered trademark of VMware, Inc. A virtual machine (VM) which belongs to an EPG is attached to the DVS port group associated with the EPG. Merely for ease of illustration, the examples presented herein are described with reference to the use of DVS port groups (e.g., in the VMWare vSphere virtualized platform) to define an EPG. However, it is to be appreciated that the examples may be used with other constructs and other virtualized platforms, such as the Microsoft® virtualization platforms/solutions, where an EPG is defined using a different data structure. Microsoft is a registered trademark of Microsoft Corporation.

A bridge domain (BD) is a broadcast domain created for certain software defined networks. In general, endpoints within a bridge domain can communicate freely with each other. Bridge domains can include multiple EPGs and endpoints within a bridge domain, but in different EPGs, can communicate with each other when there is a defined contract between the EPGs to communicate.

Typically, communication among endpoints in the same EPG is implicitly allowed by default. However, a tighter security model may require regulating intra-EPG communication as well as inter-EPG communication (e.g., through a contract). Leaving intra-EPG communication enabled by default may lead to a security hole in a data center with numerous tenants that each use a shared backup or management server. The EPG of the shared backup-management server should be configured to prevent leaks across different tenants.

Intra-EPG isolation, as used herein, is defined as the ability to isolate all physical or virtual endpoints within an EPG from one another. The data center administrator may enable intra-EPG isolation to isolate all of the workloads in the same application tier of a multi-tiered application. In one example, all web servers may be isolated within the web tier, which prevents security threats from moving laterally within the data center. Endpoints that are parts of different EPGs can only communicate if there is a contract defined between the two EPGs. Intra-EPG isolation allows putting an EPG in a mode such that communication among its associated endpoints is blocked.

Intra-EPG isolation allows a reduction in the number of EPGs and encapsulations required for scenarios in which many clients access a common service, but where the clients are not allowed to communicate with each other. In other words, intra-EPG isolation allows optimizing resources for scenarios in which endpoints have common access requirements, but are independent from one another. For instance, clients of a backup service may have the same communication requirements for access to the backup service, but they do not need to communicate with each other. In another example, servers behind a load balancer have the same communication requirements with the load balancer, but users may want to isolate the servers from each other in case one of the servers becomes compromised and/or infected.

Typically, data centers solve the problem of separating tenants using private VLANs (PVLANs). In these arrangements, separate VLANs may be configured under ports to isolate endpoints, with additional promiscuous and trunk ports to create unique pairs of secondary VLAN and primary VLAN under each of the access layer, the aggregation layer, and the core layer. However, this leads to additional VLAN allocation and configuration complexity. The techniques presented herein provide intra-EPG isolation for VLAN-based virtual endpoints and VxLAN-based endpoints, as well as bare metal endpoints, without the need for PVLANs and promiscuous VLANs. Additionally, traditional 3-layer data centers with PVLAN solutions do not provide intra-EPG isolation for VxLAN-based endpoints. As implemented in an ACI fabric, intra-EPG isolation consumes very few internal VLAN resources so that customers do not have to worry about VLAN scale or managing additional VLANs across different layers in the data center.

Figure 1:
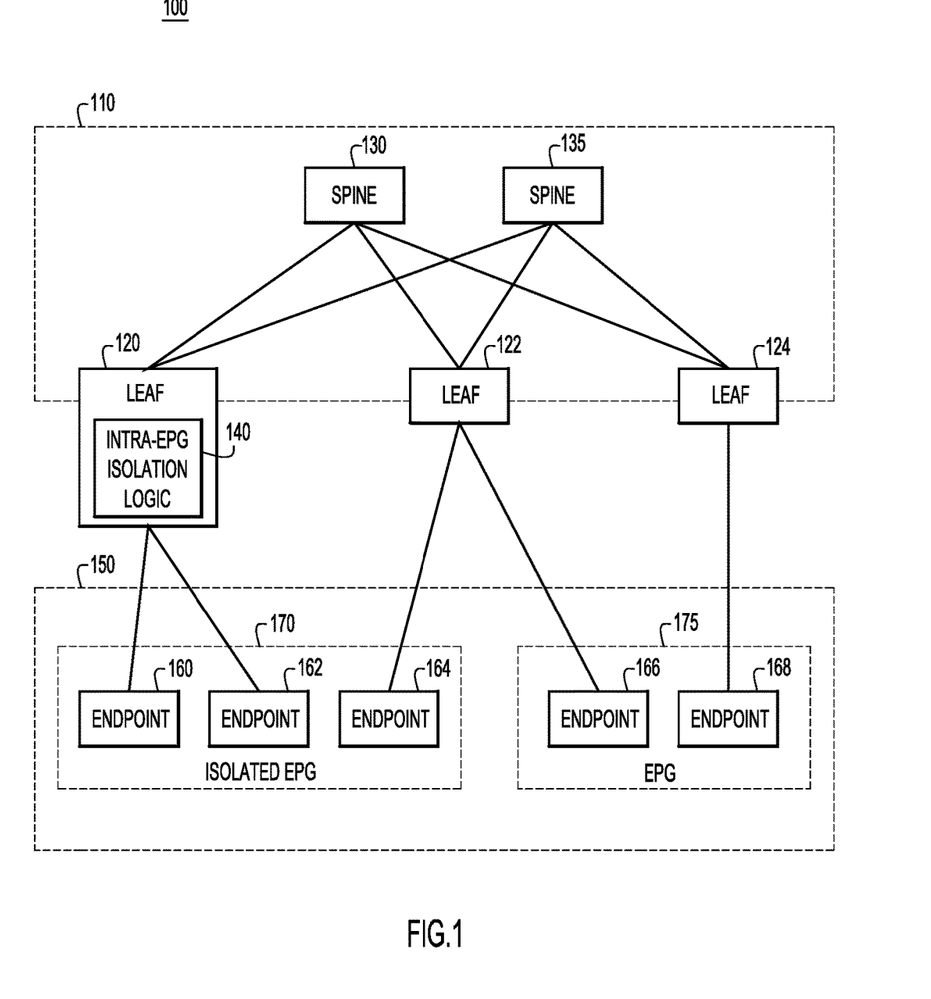
FIG. 1 is a block diagram of a network environment configured to implement endpoint group (EPG) isolation techniques, according to an example embodiment.

Referring now to FIG. 1, a simplified block diagram of a data center 100 configured to implement intra-EPG isolation is shown. The network fabric 110 of the data center 100 includes leaf nodes 120, 122, and 124, which are connected to spine nodes 130 and 135 in a Clos topology. The leaf node 120 includes intra-EPG isolation logic 140 to process/forward communications from endpoints that belong to particular EPGs. That is, as described further below, the intra-EPG isolation logic 140 is configured to prevent endpoints in isolated EPGs from communicating with each other. The network fabric 110 carries packets for endpoints in the bridge domain 150, such as endpoints 160, 162, 164, 166, and 168. In the bridge domain 150, the endpoints 160, 162, and 164 belong to an EPG 170 and the endpoints 166 and 168 belong to an EPG 175. In one example, the EPG 170 is an isolated EPG in which endpoints 160, 162, and 164 are not allowed to communicate with each other (i.e., intra-EPG isolation is enabled). However, EPG 175 is not restricted to be an isolated EPG. In one example, endpoints 160, 162, and 164 in EPG 170 may be clients of a backup service which is endpoint 168 in EPG 175.

The network fabric 110 may be an ACI fabric that carries packets between the leaf nodes 120, 122, and 124 through the spine nodes 130 and 135 with an overlay VxLAN header. In one specific example, the network fabric 110 may only have the capability to carry a single outer VLAN header, which carries the infrastructure VLAN ID. This may lead to a challenge in carrying enough context to other devices in the Clos model of the network fabric 110 to determine whether the packet originated from the isolated EPG 170.

Figure 2:
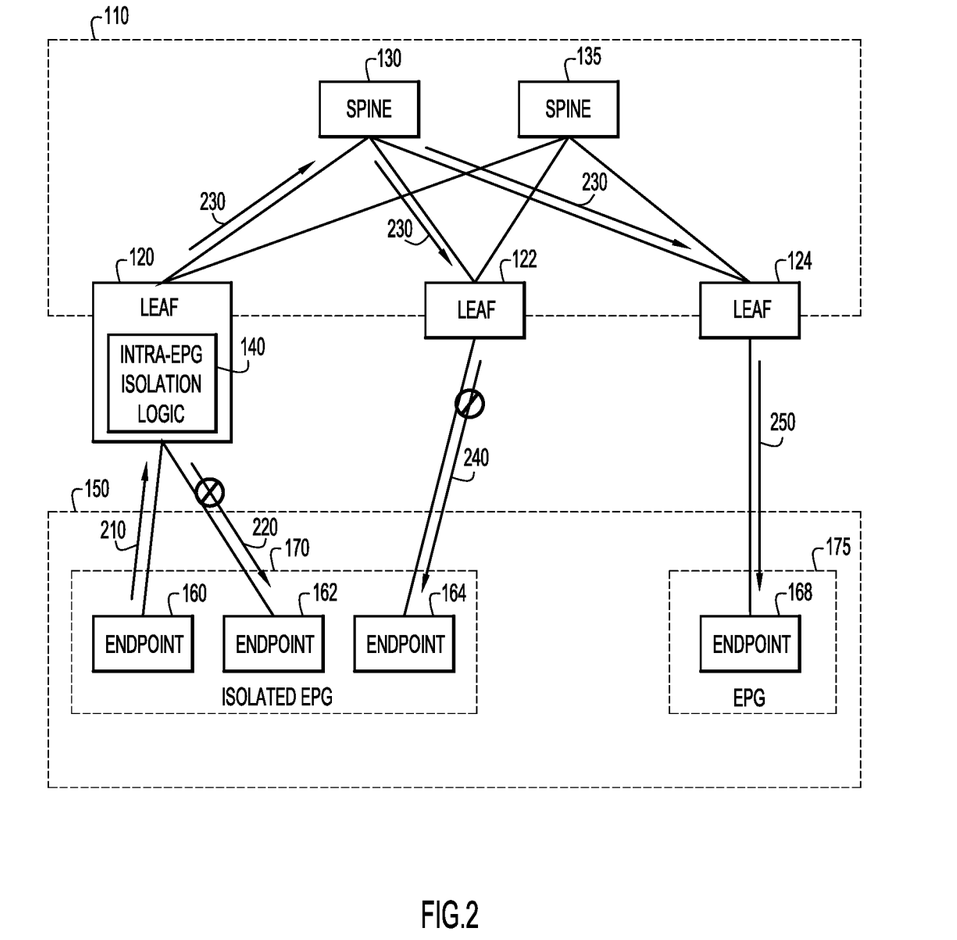
FIG. 2 is a block diagram illustrating messages originating from endpoints in an isolated EPG, according to an example embodiment.

Referring now to FIG. 2, a simplified block diagram shows where packets are dropped to achieve intra-EPG isolation for packets that may be switched within the same leaf node (i.e., intra-leaf) or across the network fabric to a different leaf node (i.e., inter-leaf). The endpoint 160 belongs to the EPG 170 and originates a packet 210 to the leaf node 120. In the intra-leaf scenario, the leaf node 120 will detect that the destination endpoint 162 is in the same isolated EPG 170 as the source endpoint 160, and drop the packet 220 before it reaches the endpoint 162.

For the inter-leaf scenario, the leaf node 120 (i.e., the ingress leaf) encapsulates the packet 210 as a fabric packet 230 and incorporates the context of the isolated EPG of the source endpoint 160 in the header of the fabric packet 230. The leaf node 120 sends the fabric packet 230 to the spine node 130, which forwards the fabric packet 230 to the other leaf nodes 122 and 124 according to the destination specified by the original packet 210.

When the leaf node 122 receives the fabric packet 230, it determines that the destination endpoint 164 attached to the leaf node 122 is in the isolated EPG 170 and drops the packet 240 before it reaches the endpoint 164. When the leaf node 124 receives the fabric packet 230, it determines that the destination endpoint 168 attached to the leaf node 124 is in EPG 175 and forwards the decapsulated packet 250 to the destination endpoint 168.

In one example, the packet 210 may be a known unicast packet, i.e., a packet with a single destination for an endpoint with a known address. A known unicast packet is only sent to the network elements along one route between the source endpoint and the destination endpoint. Alternatively, the packet 210 may be a multi-destination packet (e.g., a broadcast, unknown unicast, or multicast packet) that may be sent along multiple network routes to one or more destination endpoints. Multi-destination traffic can consume a large amount of network bandwidth due to a large number of potential recipients.

For both inter-leaf and intra-leaf scenarios, known unicast packets 220 and 240 will be dropped by hitting a deny rule implemented in an egress ACL implemented in the leaf node 120 and 122, respectively. The egress ACL implements the deny rule in a policy ternary content addressable memory (TCAM) that matches the EPG of the source endpoint 160 and the EPG of the destination endpoint 162/164. The deny rule that implements EPG isolation for known unicast packets is analogous to contracts between EPGs. Each contract between two EPGs (e.g., EPG A and EPG B) is implemented in the policy TCAM as a permit rule specifying that the source EPG A is permitted to communicate with the destination EPG B. EPG isolation is implemented as a deny rule specifying that the source EPG A is not permitted to communicate with the destination EPG A.

In one example, policy control tags (PcTags) may be used as the classification context of the isolated EPG for known unicast traffic within the fabric 110. To prevent known L2/L3 intra-leaf traffic, deny contracts are installed in the zoning rule policy TCAM of each leaf node 120, 122, and 124 of the fabric 110. For instance, if the source class of the packet 210 is an isolated EPG PcTag and the destination class is an isolated EPG PcTag, then the leaf node will drop the packet.

Contracts are not typically applied to multi-destination traffic, since the destination is not classified according to a known, single value. Ingress ACLs and egress ACLs are used to drop multi-destination packets in both intra-leaf and inter-leaf scenarios. At the ingress leaf 120, an ingress ACL marks a multi-destination packet 210 with the context that the source endpoint 160 belongs to an isolated EPG, such as EPG 170. In one example, the ingress ACL causes any multi-destination packet 210 to be marked with a Class Of Service (COS) value of 7 (i.e., the highest priority) and a Drop Eligible Indicator (DEI) value of 1 (i.e., the packet may be dropped). This combination of COS and DEI may be reserved to indicate isolated EPG context of the source endpoint 160, and is unlikely to be used otherwise due to the unlikeliness of high priority packets being drop eligible. Typically, traffic originating from endpoints that are not in an isolated EPG will be marked with a DEI value of 0 (i.e., the packet should not be dropped) as the traffic flows through the fabric 110. At the egress leaf, an egress ACL determines the source context of an isolated EPG, and if the packet is directed to the isolated EPG, then the packet is dropped.

If the multi-destination packet is being switched intra-leaf (i.e., the ingress leaf 120 is also the egress leaf 120), then the packets 210 and 220 will not have an overlay header associated with the fabric 110. In this case, only the inner COS and DEI (i.e., on the VLAN header for the VLAN associated with the EPG 170) is marked to carry the source endpoint 160 isolation context. Since the packet 220 is egressing to the endpoint 162 in the isolated EPG 170, the egress ACL on the leaf node 120 matches with a rule that drops the packet 220. In other words, the ingress ACL causes the leaf node 120 to mark the source endpoint isolation context on the packet 210 and the egress ACL causes the leaf node 120 to drop the packet 220 based on the source endpoint isolation context and the destination endpoint isolation context.

If the multi-destination packet 210 is sent across the fabric 110, the source isolation context is carried into the overlay header of the fabric 110. In one example, the COS=7 and DEI=1 values are pushed from the inner VLAN header to the overlay VLAN header (e.g., of packet 230) at the ingress leaf 120. At the egress leaf 122 and 124, the source isolation context carried in the overlay header of the packet 230 is pushed back into the inner VLAN headers of packets 240 and 250, respectively. In one example, the COS=7 and DEI=1 values in the overlay header are classified and pushed into the inner VLAN header through QoS marking tables.

In another example, a customer may require the overlay header of the fabric 110 to carry through QoS parameters from the inner VLAN headers (e.g., through 802.1p preservation/remarking). Additionally, the overlay COS value may be used in queueing/prioritization with the fabric 110, which would interfere with the ability to use the overlay COS/DEI value to carry the source endpoint isolation context. In this case, the overlay Differentiated Services Code Point (DSCP) may be used to carry the source endpoint isolation context to the egress leaf 122 or 124, which will re-derive the inner VLAN header COS, DEI, and queueing class. For instance, the overlay DSCP=63 value may be reserved to indicate the source endpoint isolation context, causing the egress leaf (e.g., leaf 122 or 124) to mark the inner VLAN header with COS=7 and DEI=1

For 802.1p preservation/marking to function in an ACI fabric 110, the overlay COS value is not available to be modified, since the COS value is used for queuing within the spine nodes 130 or 135. In this case, the overlay COS remains untouched by the intra-EPG isolation solution, and the source endpoint isolation context of the incoming COS value and queuing class is embedded within the overlay DSCP (e.g., 3 bit COS value+3 bit queuing class=6 bit DSCP). When the packet 230 is coming from the spine node 130 to the leaf node 122/124, this reserved value of the overlay DSCP is reclassified to derive the queuing class and outgoing COS of the inner header. Packets originating from an isolated endpoint may not support 802.1p preservation/marking. When 802.1p preservation/remarking is enabled, since the classification is based on the DSCP received at the leaf node 122/124, the reserved value of DSCP=63 is used so that it may be matched in order to re-derive the inner COS=7 and DEI=1 values.

Since the overlay header values of COS=7, DEI=1, and DSCP=63 may be reserved values to indicate the source endpoint isolation context, special care is taken in the spine nodes 130 and 135 to preserve this information even when the traffic is going over a fabric that spans multiple sites/pods. The ACI fabric supports isolation of VLAN and VxLAN encapsulated EPGs. TCAM scale for the ingress/egress ACLs may be an issue if each of the VLANs and VxLANs are individually matched in the leaf nodes to hit the rules described herein. As a further optimization, VLAN EPGs may be identified by a single internal label reserved for isolated VLANs. In the case of isolated VxLAN EPGs, the VxLAN VNID may be kept in a reserved range from 0x900000 to 0x90FFFF, so the isolated VxLANs may be identified through a single TCAM entry within the fabric.

Figure 3:
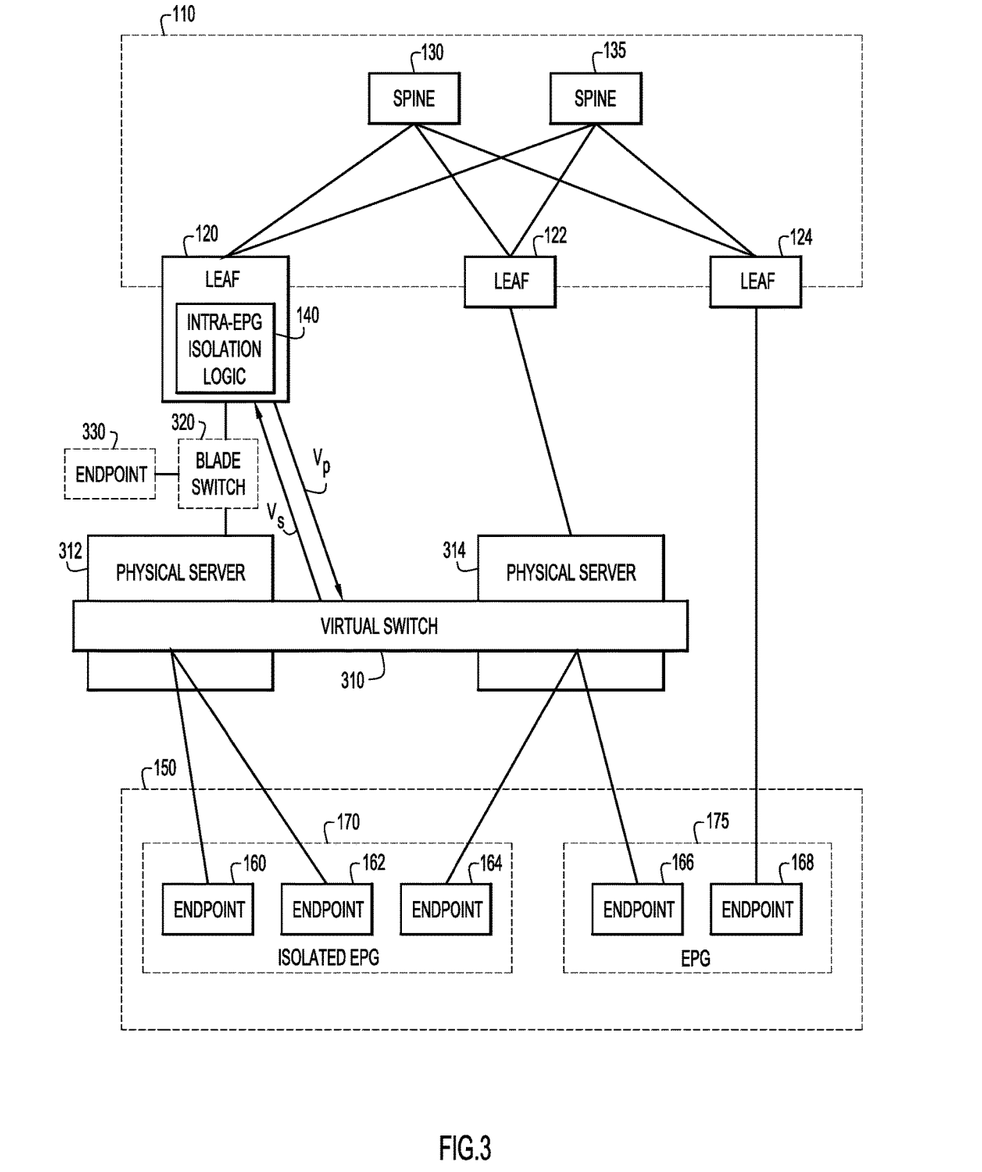
FIG. 3 is a block diagram of a network environment in which a virtual switch is configured to implement EPG isolation techniques, according to an example embodiment.

Referring now to FIG. 3, a simplified block diagram shows a data center configured to implement intra-EPG isolation for endpoints (e.g., virtual machines) behind a virtual switch (e.g., a Distributed Virtual Switch (DVS) or Application Virtual Switch (AVS)). Virtual switch 310 is implemented across physical servers 312 and 314, which are attached to leaf nodes 120 and 122, respectively. The physical server 312 may be connected to the leaf node 120 through a blade switch 320, and the blade switch 320 may have another endpoint 330 directly attached. The virtual switch 310 connects the three endpoints 160, 162, and 164 that belong to the isolated EPG 170, as well as the endpoint 166 that belongs to a different EPG 175.

For physical endpoints (e.g., bare metal servers), security is provided with intra-EPG isolation. In one example, for virtual endpoints (e.g., virtual machines 160, 162, 164, and 166) behind a DVS 310, a secondary VLAN $V_S$ is enabled on the DVS 310 so that all traffic from the virtual endpoints in the isolated EPG are sent to the fabric 110 through a trunk uplink. Any downstream traffic from the fabric 110 to the DVS 310 will be tagged with the primary VLAN $V_P$, instead of the VLAN $V_S$ of the isolated EPG 170. However, the primary VLAN $V_P$ within the fabric 110 does not consume extra VLAN resources. It is merely used to translate the outgoing VLAN in the downlink from the secondary VLAN $V_S$ to the primary VLAN $V_P$.

Figure 4:
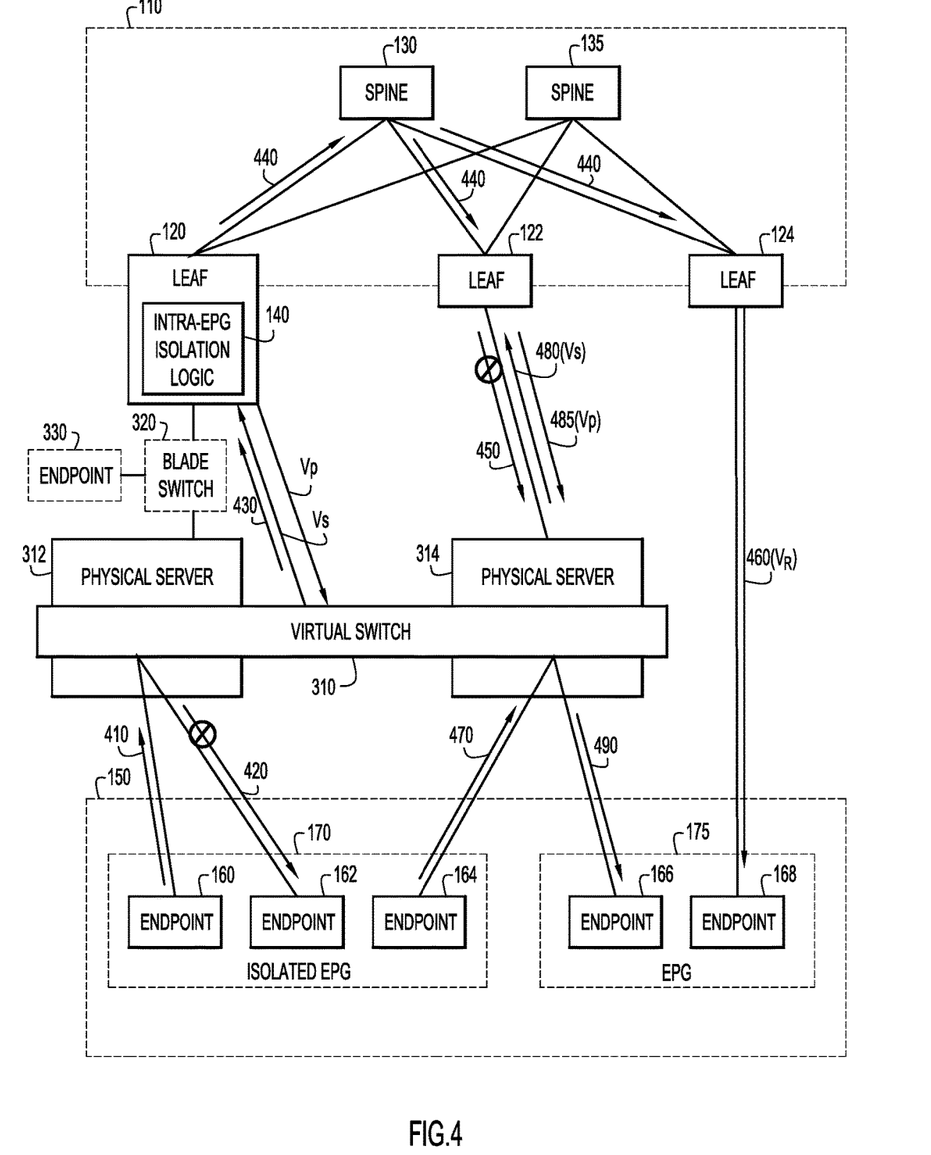
FIG. 4 is a block diagram illustrating an arrangement in which messages originate from endpoints in an isolated EPG that are connected to a virtual switch, according to an example embodiment.

Referring now to FIG. 4, a simplified block diagram shows where packets are dropped to achieve intra-EPG isolation with a virtual switch 310 in the network topology outside of the fabric 110. The source endpoint 160 sends packet 410 to the physical server 312 implementing the virtual switch 310. The packet 410 is sent in the VLAN $V_S$ that is used as the uplink trunk for the virtual switch 310. For endpoints (e.g., endpoint 162) local to the physical server 312, the virtual switch 310 denies the intra-EPG traffic and drops the packet 420 via PVLAN functionality. In other words, the virtual switch 310 will not perform any local switching.

As part of the PVLAN functionality, the physical server 312 configures the uplink port to send the packet 430 to the leaf node 120, optionally via the blade switch 320, in an isolated trunk mode. Each isolated EPG (e.g., EPG 170) may have its own VLAN (e.g., $V_S$) configured as the uplink to the leaf node (e.g., leaf node 120) and a primary VLAN (e.g., $V_P$) configured as the downlink from the leaf node. The blade switch 320 may be configured similarly to the virtual switch 310 in an isolated trunk mode that sends uplink traffic (e.g., packet 430) in an isolated VLAN (e.g., $V_S$) to the leaf node 120 and receives downlink traffic in the primary VLAN (e.g., $V_P$).

Once the packet 430 reaches the fabric 110, the ingress leaf node 120 encapsulates the packet 430 with the overlay header and generates the fabric packet 440. As described with respect to FIG. 2, the overlay header of the packet 440 includes the source endpoint isolation context (e.g., through COS, DEI, and/or DSCP values). As with the scenario described in FIG. 2, the egress leaf node 122 determines that the destination of the packet 450 is endpoint 164. With the determination that the endpoint 164 is in the isolated EPG 170, the leaf node 122 drops the packet 450. Similarly, the egress leaf 124 receives the packet 440 and determines that the destination of the packet 460 is endpoint 168. Since the endpoint 168 is in the EPG 175, the egress leaf 124 permits the packet 460 to continue to the endpoint 168 according to the contract that has been established between EPG 170 and EPG 175.

In another example of a message flow in FIG. 4, endpoint 164 originates packet 470 from the isolated EPG 170 with a destination of the endpoint 166 in the EPG 175. Since the virtual switch 310 does not perform any local switching, the physical server 314 sends the packets 480 in the uplink trunk (e.g., VLAN $V_S$) to the leaf node 122 of the fabric 110. The leaf node 122 determines then forwards the packet 485 in the downlink trunk (e.g., VLAN $V_P$) back to the physical server 314 of the virtual switch 310. The virtual switch 310 receives the packet 485 and forwards the packet 490 to the destination endpoint 166 in the VLAN associated with the EPG 175 (e.g., VLAN $V_R$).

Described another way, the virtual switch 310 drops packet 420 because it does not perform any local switching among the endpoints in the isolated EPG 170. This may be implemented as a PVLAN for the EPG 170 that only allows uplink access. Additionally, the virtual switch 310 does not perform any decision on whether to switch packets between endpoints in different EPGs, such as packet 470. Instead, the virtual switch 310 forwards the packets to the fabric 110 and allows the ACLs at the leaf nodes to determine whether to drop the packet for intra-EPG isolation.

In another example, the virtual switch may 310 be an Application Virtual Switch (AVS) with VxLAN endpoints 160, 162, 164, 166, and 168. The AVS 310 does not perform any intra-host switching (e.g., dropping packet 420). Similarly, inter-host traffic is forwarded to the fabric 110 and dropped for isolated EPGs (e.g., dropping packet 450), or forwarded to the appropriate endpoint for inter-EPG traffic with a contract between the EPGs (e.g., forwarding packet 460).

Figure 5:
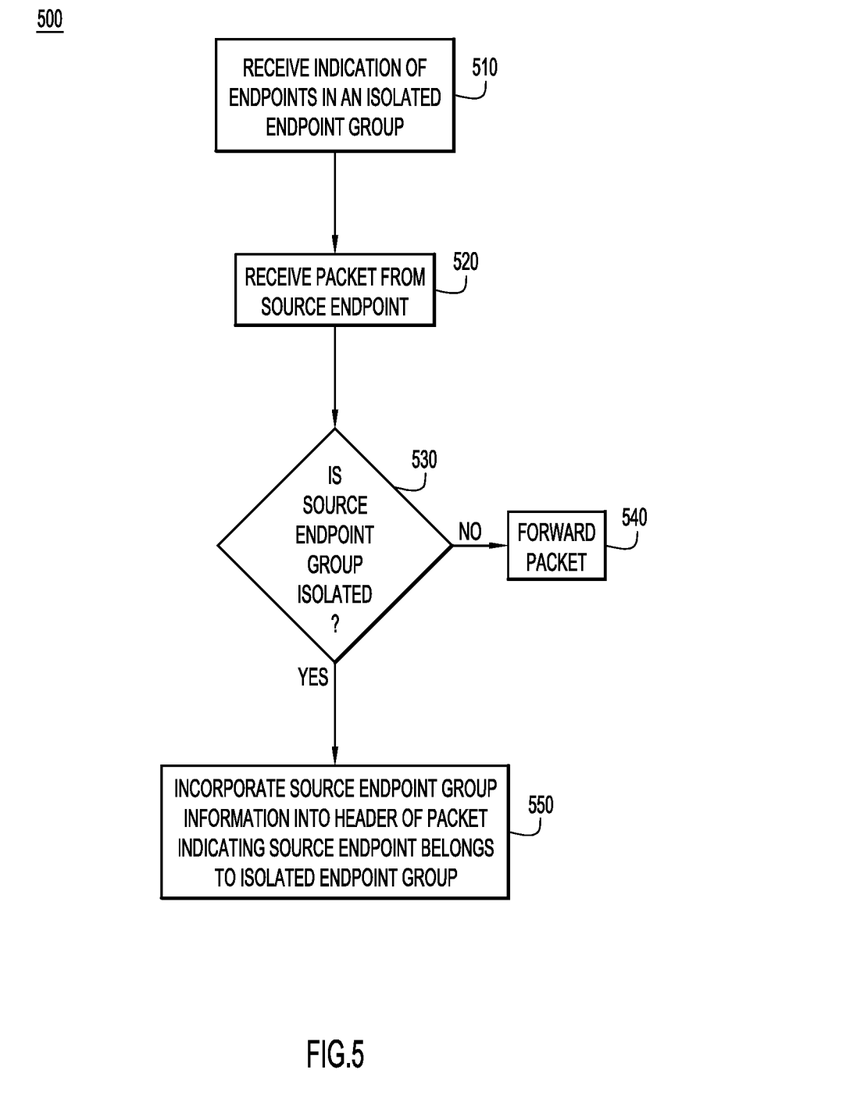
FIG. 5 is a flowchart of a method for marking packets with source EPG information, according to an example embodiment.

Referring now to FIG. 5, a flowchart illustrates a process 500 performed by an ingress leaf (e.g., leaf node 120) in enforcing intra-EPG isolation. In step 510, the ingress leaf receives an indication that a plurality of endpoints are in an isolated EPG. In one example, the indication of the endpoints may be received when the isolated EPG is initially set up or when additional endpoints are added to an isolated EPG that was previously configured. In step 520, the ingress leaf receives a packet from a source endpoint and, at 530, detects whether the source endpoint is one of the plurality of endpoints in the isolated EPG. If the packet is not from a source endpoint in the isolated EPG, as determined in step 530, then the ingress leaf forwards the packet in step 540 (e.g., based on a contract established between the EPG of the source endpoint and the EPG of the destination endpoint).

If the packet is from a source endpoint in the isolated EPG, as determined in step 530, then the ingress leaf incorporates source endpoint group information into a header of the packet. The source endpoint group information indicates that the source endpoint belongs to the isolated EPG. In one example, the source endpoint group information includes QoS fields in a VLAN header (e.g., COS, DEI, DSCP) with reserved values (e.g., COS=7, DEI=1, DCSP=63) indicating that packet originated from an isolated EPG.

Figure 6:
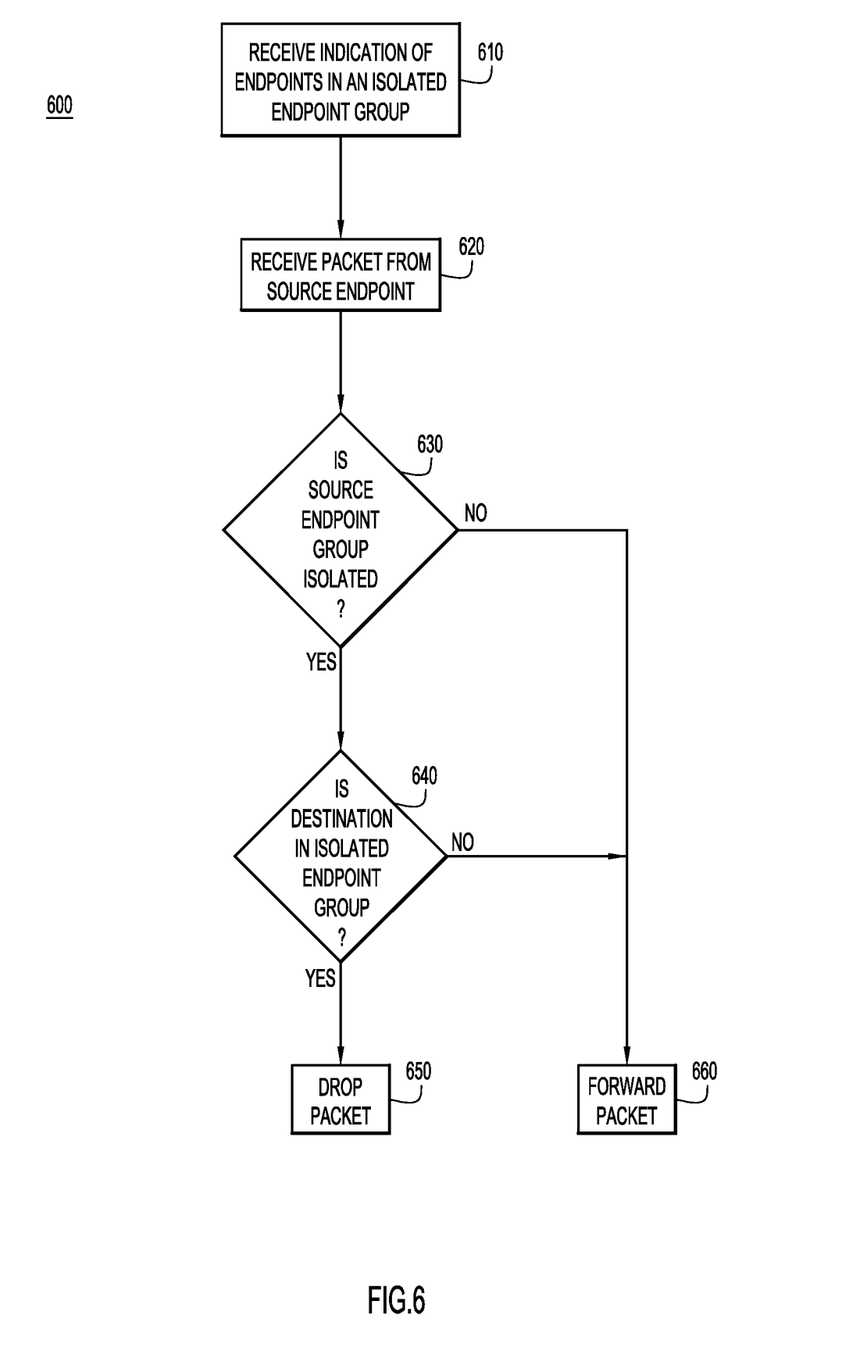
FIG. 6 is a flowchart of a method for dropping packets between a source endpoint and a destination endpoint in an isolated EPG, according to an example embodiment.

Referring now to FIG. 6, a flowchart illustrates a process 600 performed by an egress leaf (e.g., leaf node 122) in enforcing intra-EPG isolation. In step 610, the egress leaf receives an indication that a plurality of endpoints are in an isolated EPG. In one example, the indication of the endpoints may be received when the isolated EPG is initially set up or when additional endpoints are added to an isolated EPG that was previously configured. In step 620, the egress leaf receives a packet from a source endpoint in an EPG. In one example, the packet is received at the egress leaf from the source endpoint via a network fabric. Alternatively, the egress leaf may receive the packet from the source endpoint (i.e., the egress leaf for the destination endpoint is the same as the ingress leaf for the source endpoint).

If the source endpoint belongs to an isolated EPG, as determined in step 630, then the egress leaf determines if a destination endpoint specified by the destination address of the packet is in the isolated EPG in step 640. If the egress leaf determines that a destination endpoint is also in the isolated EPG, then the egress leaf drops the packet to that destination endpoint at step 650. If the egress leaf determines that either the source endpoint is not in an isolated EPG (i.e., in step 630) or the destination endpoint is not in the isolated EPG (i.e., in step 640), then the egress leaf forwards the packet in step 660 (e.g., based on a contract established between the EPG of the source endpoint and the EPG of the destination endpoint).

Figure 7:
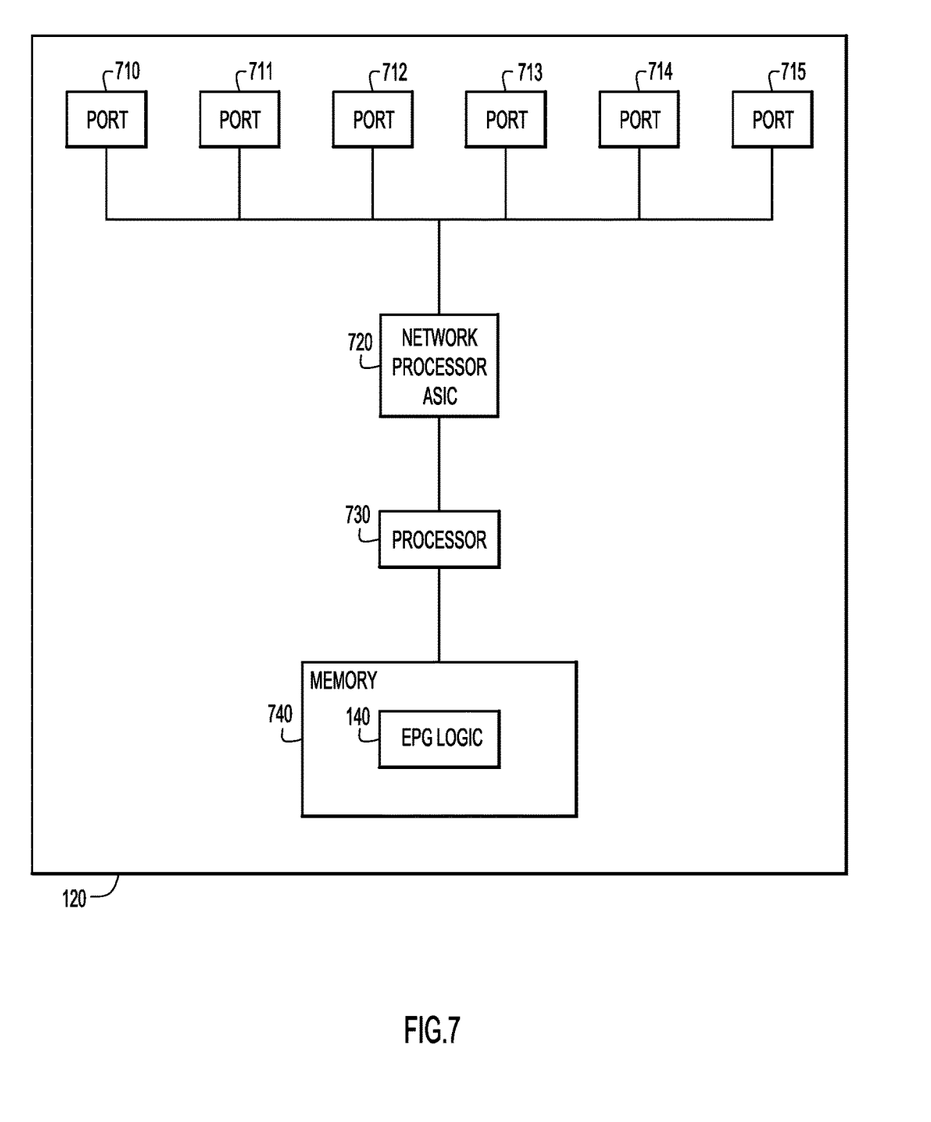
FIG. 7 is a block diagram of a networking device, according to an example embodiment.

FIG. 7 illustrates a block diagram of a networking device 120 (e.g., leaf node/switch) that is configured to participate in the techniques presented herein. The networking device 120 includes a network interface unit in the form of a plurality of network ports 710-715, a processor Application Specific Integrated Circuit (ASIC) 720 that performs network processing functions, one or more processors 730 (e.g., microprocessors or microcontrollers), and memory 740. The memory 740 stores intra-EPG isolation logic 140, which may include instructions for processing the EPG-based handling of packets from isolated EPGs. It is to be understood that, in certain examples, the network device 120 may be a virtual (software-based) appliance.

The memory 740 may include read only memory (ROM), random access memory (RAM), magnetic disk storage media devices, optical storage media devices, flash memory devices, electrical, optical, or other physical/tangible memory storage devices. Thus, in general, the memory 130 may comprise one or more tangible (non-transitory) computer readable storage media (e.g., a memory device) encoded with software comprising computer executable instructions and when the software is executed (by the one or more processors 730) it is operable to perform the operations described herein with reference to a leaf node.

In summary, the intra-EPG isolation techniques presented herein provide more security in multi-tier data centers by preventing communication among endpoints within an isolated EPG. Intra-EPG isolation provides additional security for tenants of the data center by preventing communication among endpoints of an EPG. While the same effect could be achieved with multiple EPGs with no contracts between them (i.e., one EPG for each tenant, each with a contract to the common service EPG), the techniques presented herein save resources within the data center fabric, which enhances scaling of additional EPGs. Creating an EPG for each tenant, or each endpoint, leads to an exponentially growing number of contracts as each new EPG requires its own contract with the common service EPG. As the number of contracts grows, the TCAM resources of the policy ACL would be increasingly strained without the techniques described herein.

Rather than creating a multitude of "permit" contracts (i.e., between each tenant/endpoint and each common service), the techniques presented herein conserve policy TCAM resources by using relatively few group "permit" rules along with some blanket "deny" rules. By hiding VLAN and VxLAN resources, these techniques hide management complexity and aids ease of use for customers. Additionally, the techniques presented herein provide support for VxLAN EPG isolation, which is not typically supported in traditional 3-layer data centers.

In one form, a computer-implemented method enables an ingress network device of a network fabric to mark packets with source endpoint group information and provide intra-EPG isolation. The ingress network device receives an indication that a plurality of endpoints are associated with a first isolated endpoint group that restricts network traffic among the plurality of endpoints. The ingress network device receives a packet from a source endpoint and detects that the source endpoint is one of the plurality of endpoints in the first isolated endpoint group. The ingress network device incorporates source endpoint group information into a header of the packet. The source endpoint group information indicates that the source endpoint belongs to the first isolated endpoint group.

In another form, an apparatus comprising a network interface, a memory, and a processor are configured to enable intra-EPG isolation at an ingress leaf of a network fabric. The network interface unit is configured to receive an indication that a plurality of endpoints connected to a network fabric are associated with a first isolated endpoint group that restricts traffic among the plurality of endpoints. The network interface unit is further configured to receive a packet from a source endpoint. The processor is configured to detect that the source endpoint is one of the plurality of endpoints in the first isolated endpoint group, and incorporate source endpoint group information into a header of the packet. The source endpoint group information indicates that the source endpoint belongs to the first isolated endpoint group.

In yet another form, a computer-implemented method enables a network device of a network fabric to provide intra-EPG isolation based on source endpoint group information. The network device receives an indication that a plurality of endpoints are associated with a first isolated endpoint group that restricts traffic among the plurality of endpoints. The network device receives a packet including a destination address from a source endpoint, and detects that the source endpoint is one of the plurality of endpoints associated with the first isolated endpoint group. The network element determines whether a destination endpoint reached at the destination address by the network element is among the plurality of endpoints associated with the first isolated endpoint group. Responsive to the determination that a destination endpoint reached at the destination address by the network element belongs to the first isolated endpoint group, dropping the packet.

In still another form, one or more non-transitory computer readable media is provided with instructions to cause a processor to perform any of the methods described herein.

It is to be appreciated that the above examples are not mutually exclusive and may be combined in various arrangements. It is also to be appreciated that the above description is intended by way of example only. Various modifications and structural changes may be made therein without departing from the scope of the concepts described herein and within the scope and range of equivalents of the claims. In particular, any specific implementation details described using ACI network fabrics, VLANs, VxLANs, and/or leaf/spine networks may be implemented using any protocol and/or topology that carries information between network elements.

What is claimed is:

1. A method comprising:
    at an ingress network device of a network fabric, receiving an indication that a plurality of endpoints connected to the network fabric are associated with a first isolated endpoint group that restricts network traffic among the plurality of endpoints;
    receiving a packet from a source endpoint;
    detecting that the source endpoint is one of the plurality of endpoints in the first isolated endpoint group; and
    incorporating source endpoint group information into a virtual network header of the packet to indicate that the source endpoint belongs to the first isolated endpoint group, wherein the source endpoint group information comprises reserved values of one or more of a Class of Service (COS) field in the virtual network header, a Drop Eligible Indicator (DEI) field in the virtual network header, or a Differentiated Service Code Point (DSCP) field in the virtual network header.

2. The method of claim 1, wherein the packet is a multi-destination packet including a destination address, and wherein the method further comprises:
    determining that the destination address is associated with at least one destination endpoint that is one of the plurality of endpoints in the first isolated endpoint group; and in response to the determining, dropping the multi-destination packet.

3. The method of claim 2, wherein determining that the destination address is associated with at least one destination endpoint that is one of the plurality of endpoints in the first isolated endpoint group further comprises:
processing the packet with an egress access control list to determine whether the at least one destination endpoint reached by the destination address belongs to the first isolated endpoint group and to determine whether the source endpoint group information indicates that the source endpoint belongs to the first isolated endpoint group.

4. The method of claim 1, wherein the packet includes a destination address, and wherein the method further comprises:
determining an egress network device of the network fabric based on the destination address;
determining that the egress network device differs from the ingress network device; and
responsive to the determination that the egress network device differs from the ingress network device, encapsulating the packet with an overlay header including the source endpoint group information.

5. The method of claim 4, further comprising, at the egress network device:
receiving the packet encapsulated with the overlay header;
removing the overlay header from the packet; and
incorporating the source endpoint group information from the overlay header into the virtual network header of the packet.

6. The method of claim 5, further comprising:
determining that the destination address is associated with at least one destination endpoint that is one of the plurality of endpoints in the first isolated endpoint group; and
in response to the determination that the destination address is associated with at least one destination endpoint in the first isolated endpoint group, dropping the packet at the egress network device.

7. The method of claim 4, wherein the overlay header comprises a Virtual Extensible Local Area Network (VxLAN) header.

8. The method of claim 7, wherein the source endpoint group information is included in a DSCP field in the overlay header, the method further comprising using a COS field in the overlay header for queuing or prioritization in the network fabric.

9. The method of claim 1, wherein incorporating source endpoint group information into the virtual network header of the packet further comprises generating an overlay header for transport of the packet in the network fabric and writing the source endpoint group information into the overlay header.

10. The method of claim 1, wherein incorporating source endpoint group information into the virtual network header of the packet comprises writing the source endpoint group information into an existing layer 3 header of the packet.

11. An apparatus comprising:
a network interface unit configured to:
receive an indication that a plurality of endpoints connected to a network fabric are associated with a first isolated endpoint group that restricts network traffic among the plurality of endpoints; and
receive a packet from a source endpoint;
a memory; and
a processor configured to:
detect that the source endpoint is one of the plurality of endpoints in the first isolated endpoint group; and
incorporate source endpoint group information into a virtual network header of the packet to indicate that the source endpoint belongs to the first isolated endpoint group, wherein the source endpoint group information comprises reserved values of one or more of a Class of Service (COS) field in the virtual network header, a Drop Eligible Indicator (DEI) field in the virtual network header, or a Differentiated Service Code Point (DSCP) field in the virtual network header.

12. The apparatus of claim 11, wherein the packet is a multi-destination packet including a destination address, and wherein the processor is further configured to determine whether the destination address is associated with at least one destination endpoint that is one of the plurality of endpoints in the first isolated endpoint group, and in response to the determination that the destination address is associated with at least one destination endpoint in the first isolated endpoint group, drop the multi-destination packet.

13. The apparatus of claim 12, wherein the processor is further configured to determine whether the destination address is associated with at least one destination endpoint that is one of the plurality of endpoints in the first isolated endpoint group by processing the packet with an egress access control list to determine whether the at least one destination endpoint reached by the destination address belongs to the first isolated endpoint group and to determine whether the source endpoint group information indicates that the source endpoint belongs to the first isolated endpoint group.

14. The apparatus of claim 11, wherein the packet includes a destination address, and wherein the processor is further configured to:
determine an egress network device of the network fabric based on the destination address;
determine that the egress network device differs from the ingress network device; and
responsive to the determination that the egress network device differs from the ingress network device, encapsulate the packet with an overlay header including the source endpoint group information.

15. The apparatus of claim 14, wherein the overlay header comprises a Virtual Extensible Local Area Network (VxLAN) header.

16. The apparatus of claim 11, wherein the processor is configured to incorporate the source endpoint group information into the virtual network header of the packet by generating an overlay header for transport of the packet in the network fabric and writing the source endpoint group information into the overlay header.

17. The apparatus of claim 11, wherein the processor is configured to incorporate the source endpoint group information into the virtual network header of the packet by writing the source endpoint group information into an existing layer 3 header of the packet.

18. A method comprising:
at a network device of a network fabric, receiving an indication that a plurality of endpoints are associated with a first isolated endpoint group that restricts network traffic among the plurality of endpoints;
receiving a packet from a source endpoint, wherein the packet includes a destination address;
detecting that the source endpoint is one of the plurality of endpoints associated with the first isolated endpoint group based on source endpoint group information comprising reserved values of one or more of a Class of Service (COS) field in a virtual network header, a Drop Eligible Indicator (DEI) field in the virtual network header, or a Differentiated Service Code Point (DSCP) field in the virtual network header;

determining whether a destination endpoint reached at the destination address by the network element is among the plurality of endpoints associated with the first isolated endpoint group; and responsive to the determination that the destination endpoint reached at the destination address by the network element belongs to the first isolated endpoint group, dropping the packet.

19. The method of claim 18, wherein the packet is a unicast packet, and wherein the determination that the destination endpoint belongs to the first isolated endpoint group comprises processing a policy rule for the first isolated endpoint group.

20. The method of claim 19, wherein processing the policy rule for the first endpoint group comprises querying a Content Addressable Memory with a source address of the source endpoint and the destination address.

* * * * *